US008155622B1

(12) United States Patent
Moshenberg et al.

(10) Patent No.: US 8,155,622 B1
(45) Date of Patent: Apr. 10, 2012

(54) SYSTEMS AND METHODS FOR PROVIDING WIRELESS TELECOMMUNICATIONS ACCESS TO AUTHORIZED WIRELESS SERVICE SUBSCRIBERS

(75) Inventors: David Moshenberg, Fair Haven, NJ (US); Leonardo Garcia, Bethesda, MD (US)

(73) Assignee: AT&T Mobility II LLC, Atlanta, GA (US)

( * ) Notice: Subject to any disclaimer, the term of this patent is extended or adjusted under 35 U.S.C. 154(b) by 286 days.

(21) Appl. No.: 11/743,400

(22) Filed: May 2, 2007
(Under 37 CFR 1.47)

(51) Int. Cl.
*H04M 1/66* (2006.01)

(52) U.S. Cl. ..................... 455/410; 455/411; 455/414.2; 455/456.4; 455/558; 455/268; 713/193; 726/30

(58) Field of Classification Search ................... 455/411
See application file for complete search history.

(56) References Cited

U.S. PATENT DOCUMENTS 6,640,097 B2 * 10/2003 Corrigan et al. ........... 455/414.1
7,024,174 B2 * 4/2006 Nagy et al. .................... 455/408
7,231,203 B2 * 6/2007 Marcelli ....................... 455/411
7,257,834 B1 * 8/2007 Boydstun et al. ................. 726/1
2002/0052754 A1 * 5/2002 Joyce et al. ....................... 705/1
2003/0051164 A1 * 3/2003 Patton ........................... 713/201
2004/0162105 A1 * 8/2004 Reddy et al. .................. 455/551
2006/0084472 A1 * 4/2006 Park .............................. 455/558
2007/0093255 A1 * 4/2007 Nurminen et al. ............ 455/455
2007/0183427 A1 * 8/2007 Nylander et al. .......... 370/395.2
2008/0010215 A1 * 1/2008 Rackley, III et al. ........... 705/70
2008/0120717 A1 * 5/2008 Shakkarwar ..................... 726/18
2008/0242299 A1 * 10/2008 Edwards et al. ........... 455/435.2

* cited by examiner

*Primary Examiner* — Charles Appiah
*Assistant Examiner* — Randy Peaches
(74) *Attorney, Agent, or Firm* — Parks IP Law LLC; Jennifer P. Medlin, Esq.

(57) ABSTRACT

A system for providing authorized wireless telecommunication access is provided. The system includes at least one password-protected cellular access (PPCA) node and a database. The database is configured to receive an identifier from a mobile terminal and correlate the identifier with PPCA node data to determine if the mobile terminal is authorized to use a particular PPCA node. A method for providing authorized wireless telecommunication access is also provided.

13 Claims, 3 Drawing Sheets

SYSTEMS AND METHODS FOR PROVIDING WIRELESS TELECOMMUNICATIONS ACCESS TO AUTHORIZED WIRELESS SERVICE SUBSCRIBERS

TECHNICAL FIELD

The present invention relates generally to wireless telecommunications and, more particularly, to systems, methods, and devices for providing wireless telecommunications access to one or more authorized subscribers.

BACKGROUND OF THE INVENTION

Disasters, terrorist attacks, and major accidents dramatically increase wireline and wireless telephone traffic. After the Sep. 11, 2001 attacks, wireless carriers reported traffic increased from 50 percent to 100 percent over the nationwide average. Wireless traffic increased to upwards of 1000 percent in the New York area and 400 percent in Washington D.C. During these times, the wireless communication access for first responders and other emergency personnel is limited to the capacity of the wireless networks.

The National Communications Commission (NCC) has promoted the concept of Wireless Priority Service (WPS) since the early nineties, however, the 9/11 attacks have given rise to an expedited plan to provide such a service. Presently, WPS service is available from multiple wireless carriers including the assignee of this application. WPS allows subscribers to dial *272 and the destination number to request priority over other callers. This service, however, does not provide pre-emption capability; that is, other callers are not disconnected in favor of the WPS subscriber. Rather, the WPS subscriber is placed in a queue for the next available traffic channel. If a non-WPS subscriber is also in the queue, the WPS subscriber is given priority. Although the WPS system allows a subscriber to receive priority over other callers, the network systems used by WPS remain the same for all subscribers and are subject to the number of channels, bandwidth, and Quality of Service (QoS) of those systems. Moreover, in certain disaster areas the wireless network systems may be damaged and rendered inoperable.

Thus what is needed is a system and method to facilitate wireless communication in areas where no wireless service is available. Further, a system and method is needed to provide access to a selected group of subscribers. Furthermore, a system and method is needed to facilitate wireless communication in areas where secure wireless service is required. Still further, a portable system is needed to quickly and easily establish a wireless communications network in a particular area; for example, to offer wireless communication services to first responders in a disaster area.

SUMMARY

The various embodiments of the present invention overcome the shortcomings of the prior art by providing systems and for providing wireless telecommunications access to one or more authorized users. A system for providing authorized wireless telecommunication access includes at least one password-protected cellular access (PPCA) node, the PPCA node being configured to only allow access to authorized mobile terminals; and a database, the database being configured to receive an identifier from a mobile terminal and correlate the identifier with PPCA node data to determine if the mobile terminal is authorized to use a particular PPCA node. In one embodiment, the identifier is one of the following: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A method for providing authorized wireless telecommunication services is also provided. The method includes the steps of: registering a mobile terminal with a password-protected cellular access (PPCA) node; sending an identifier to a database, the database being configured to receive the identifier and correlate the identifier with PPCA node data to determine if the mobile terminal is authorized to use the PPCA node; determining if the mobile terminal is authorized to use the PPCA node based upon a correlation between the identifier and the data; denying the mobile terminal access to the PPCA node, if the mobile terminal is not authorized; sending a password request to the mobile terminal, if the mobile terminal is authorized; receiving a password request response; correlating the password request response to a password stored within the database; denying the mobile terminal access to the PPCA node, if the password request response is not equivalent to the stored password; and allowing the mobile terminal access to the PPCA node, if the password request response is equivalent to the stored password.

In one embodiment, the method further includes the steps of sending a security question request to the mobile terminal; receiving a security question response from the mobile terminal; correlating the security question response to a security question stored within the database; denying the mobile terminal access to the PPCA node, if the security question response is not equivalent to the stored password; and allowing the mobile terminal access to the PPCA node, if the security question response is equivalent to the stored security question.

According to another aspect of the present invention, a tangible computer-readable medium of a password-protected cellular access (PPCA) node includes computer-executable instructions which, when executed by the PPCA node, perform the steps of receiving an identifier from a mobile terminal and correlating the identifier with PPCA node data stored in a PPCA database associated with the PPCA node. The PPCA node data includes identifiers and passwords for a plurality of mobile terminals that are authorized to access the PPCA node. The computer-executable instructions, when executed, further cause the PPCA node to perform the steps of determining, based upon the correlation between the identifier and the PPCA node data, whether the mobile terminal is authorized to use the PPCA node for wireless telecommunications access, denying the mobile terminal wireless telecommunications access via the PPCA node, if it is determined based upon the correlation that the mobile terminal is not authorized to use the PPCA node for wireless telecommunications access, and sending a password request to the mobile terminal, if it is determined based upon the correlation that the mobile terminal is authorized to use the PPCA node for wireless telecommunications access. The computer-executable instructions, when executed, still further cause the PPCA node to perform the steps of receiving a password request response including a password from the mobile terminal, correlating the password received in the password request response to the passwords of the PPCA node data stored within the PPCA database, denying the mobile terminal wireless telecommunications access via the PPCA node, if the password received in the password request response is not equivalent to one of the passwords stored in the PPCA database, and allowing the mobile terminal wireless telecommunications access via the PPCA node, if the password is equivalent to one of the passwords stored in the PPCA database.

In some embodiments, the identifier is one of an international mobile subscriber identity (IMSI), a temporary mobile subscriber identity (TMSI); a packet temporary mobile subscriber identity (P-TMSI), a temporary logical link identity (TLLI), a mobile station ISDN (MSISDN), an international mobile station equipment identity (IMEI), and an international mobile station equipment identity and software version number (IMEISV).

In some embodiments, the password is one of a numeric password, an alphabetic password, an alphanumeric password, a speaker recognition password, a speech recognition password, an image password, a photograph password, a video password, a fingerprint identification password, and a retinal scan password.

In some embodiments, the computer-readable medium further includes instructions which, when executed, perform the additional steps of sending a security question request to the mobile terminal, the security question request including a security question that is stored as part of the PPCA node data stored in the PPCA node database and the security question being associated with a correct answer also stored in the PPCA node database, receiving a security question response from the mobile terminal, the security question response including an answer to the security question, correlating the answer to the security question received in the security question response to the correct answer to the security question stored within the PPCA database, denying the mobile terminal wireless telecommunications access via the PPCA node, if the answer to the security question received in the security question response is not equivalent to the correct answer stored in the PPCA database, and allowing the mobile terminal wireless telecommunications access via the PPCA node, if the security question response is equivalent to the correct answer stored in the PPCA database.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
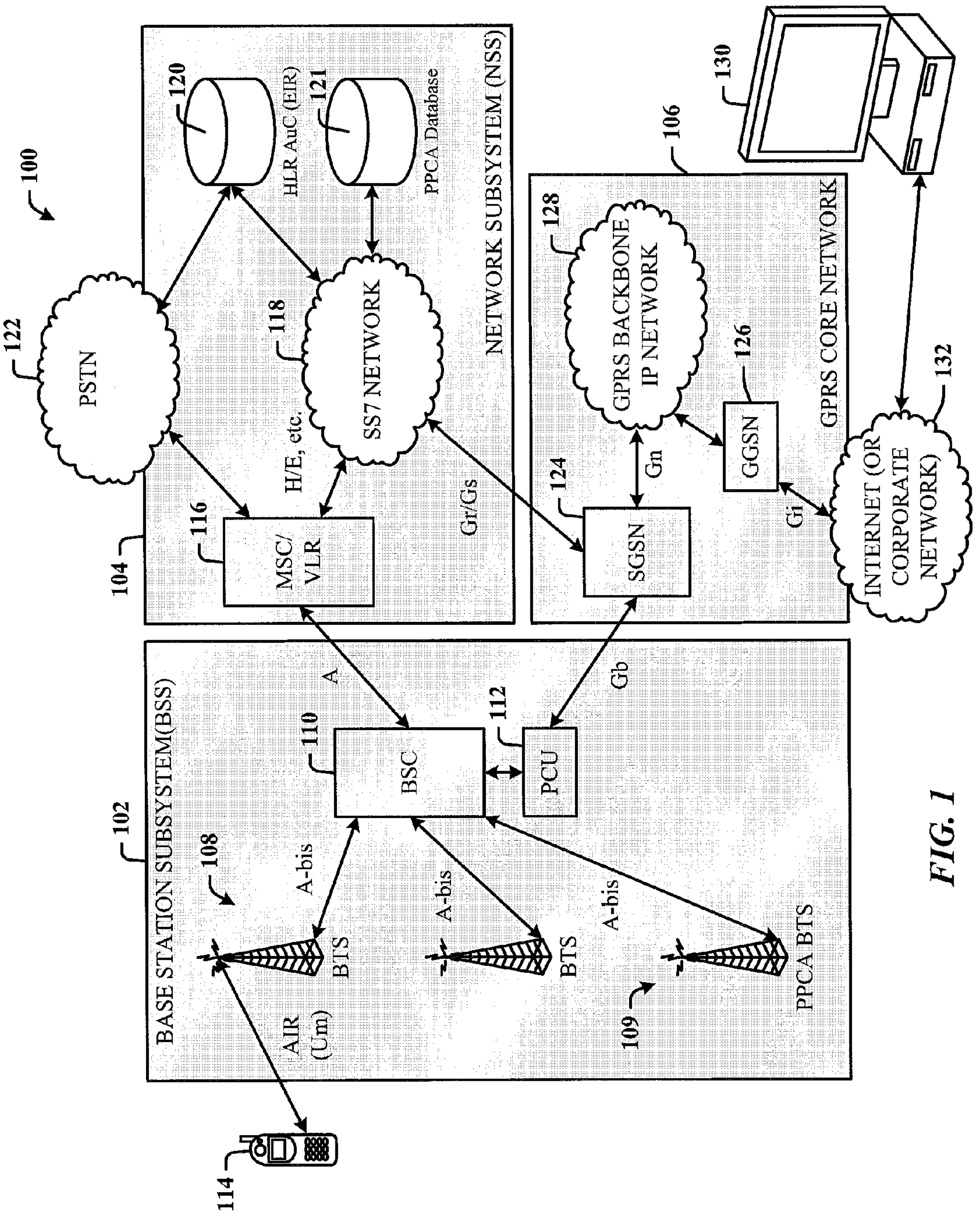
FIG. 1 illustrates an exemplary Global System for Mobile (GSM) communications network in accordance with an embodiment of the present invention.

Referring now to the drawings in which like numerals represent like elements throughout the several views, FIG. 1 illustrates an exemplary GSM network 100 in accordance with an embodiment of the present invention. The illustrated GSM network 100 includes a base station subsystem (BSS) 102, a network subsystem (NSS) 104 and a GPRS core network 106. The BSS 102 can include one or more base transceiver stations (BTS) 108. In addition and in accordance with an exemplary embodiment of the present invention, the illustrated BSS 102 includes a Password-Protected Cellular Access (PPCA) BTS 109. In an exemplary embodiment, the PPCA BTS 109 is in communication with a base station controller (BSC) 110 via an A-bis interface as are the other BTSs 108. The PPCA BTS 109 may alternatively be in communication with a BSC deployed exclusively for use with one or more PPCA BTSs.

The PPCA BTS 109 is configured to allow only a selected group of subscribers to access the network. In one exemplary embodiment, the PPCA BTS 109 is configured for use in a secure network such as a military or law enforcement application. The PPCA BTS 109 employs at least a two level security system. An exemplary first security level utilizes a subscriber identifier such as an International Mobile Subscriber Identity (IMSI) to authenticate the use of the PPCA BTS 109. In this example, a subscriber's IMSI is stored in a database and correlated with one or more PPCA BTSs. In the illustrated GSM network 100, a dedicated PPCA database 121 is provided; however, the present invention may utilize the resources of a home location register (HLR), a visiting location register (VLR), and/or one or more additional databases that perform functions other than those described with regard to the present invention to store the correlated data. As an exemplary secondary security level, a subscriber may be prompted to enter a password to further verify the subscriber's identity. Security questions may also be implemented.

The PPCA BTS 109 and the PPCA node 213 (FIG. 2) may be portable devices that can be retrofitted into existing network architecture to offer pre-authorized wireless voice and/or data access. The PPCA BTS 109 and the PPCA node 213 may also be self-contained systems and databases (e.g., the PPCA databases 121, 225 may be incorporated into the BTS/node systems) to establish a wireless network where coverage was previously unavailable or was destroyed as a result of a disaster, for example.

The aforementioned embodiment assumes that a subscriber has previously been authorized to access PPCA resources. In another exemplary embodiment, a subscriber may not have prior authorization and accordingly an authorization step can be implemented to authorize the subscriber on-the-fly. On future attempts an authentication step may be the only step required.

A service provider can authorize a subscriber by updating the appropriate database with the subscriber's IMSI and an indication that PPCA services for an area covered by a PPCA BTS are available for that subscriber. It is contemplated that this may be provided to a subscriber and charged a monthly reoccurring cost as is typically done for wireless services. Moreover, government agencies such as law enforcement, disaster relief responders, secret service and the like may be pre-authorized via similar methods. In fact, the present invention is extensible to any individual subscriber or group of subscribers. In certain implementations it may be beneficial for security or otherwise to utilize one or more Temporary Mobile Subscriber Identities (TMSIs) instead of the IMSI.

An International Mobile Equipment Identity (IMEI) may be used to identify certain equipment types as being authorized for use with a PPCA BTS such as by common serial number characters. By way of example, mobile equipment having five common serial number characters (e.g., 12345) may be issued to a first responder team. The common serial number characters and accordingly the IMEIs of each first responder's mobile equipment may be correlated with an indication of one or more authorized PPCA BTSs.

The present invention finds particular application in disaster relief scenarios that subject subscribers to limited wireless network communications resources in the affected area. In these scenarios, network congestion often prevents first responders and other necessary personnel from using the wireless network. Accordingly, the remainder of this description will focus on this application, however, it should be understood that the present invention is not limited to this application and can find application in any of the aforementioned scenarios and others that one of skill in the art may find as an implementation of the teachings provided herein.

The BTSs 108 facilitate communication between a cell phone and a cellular network. In one embodiment, the PPCA BTS 109 facilitates communication between an authorized cell phone and the cellular network. In another embodiment, the PPCA BTS 109 facilitates local communication among authorized subscribers. Base stations are all interconnected to facilitate roaming from one cell to another via a process called handover, without losing the cell connection. The handover process is functionally the same for BTS-BTS, BTS-PPCA BTS, and PPCA BTS-BTS handoffs. It should be understood, however, that if a subscriber roams from a PPCA BTS served cell to a BTS cell, the subscriber would be subject to the resources of the BTS cell after the handoff.

A packet control unit (PCU) 112 is illustrated as being in communication with the BSC 110 although the exact position of this can depend on the vendor architecture. The BSS 102 is connected by the air interface Um to a mobile terminal 114.

The BSC 110 provides the intelligence behind the BTS 108. Typically, a BSC can have tens or even hundreds of BTSs 108 under its control. The BSC 110 handles allocation of radio channels, receives measurements from the mobile phones, and controls handovers from BTS to BTS (except in the case of an inter-MSC handover in which case control is in part the responsibility of the an MSC). It is contemplated that handover procedures and authorization/authentication procedures associated with a PPCA BTS 109 can be handled by the BSC 110 and/or the MSC 116. Alternatively, dedicated BSC and MSC systems can be employed for the PPCA BTS(s). One function of the BSC 110 is to act as a concentrator such that many different low capacity connections to the BTSs 108 can become reduced to a smaller number of connections towards the MSC. Generally, this means that networks are often structured to have many BSCs 110 distributed into regions near the BTS 108 which are then connected to large centralized MSC sites.

The PCU 112 can perform some of the equivalent tasks of the BSC 110. The allocation of channels between voice and data can be controlled by the base station, but once a channel is allocated to the PCU 112, the PCU 112 takes full control over that channel. The PCU 112 can be built into the base station, built into the BSC, or even in some architecture, it can be at an SGSN site.

The BSS 102 connects to the NSS 104 by an A interface. The NSS 104 is shown containing an MSC 116 connected via an SS7 network 118 to a home location register (HLR) 120. The AuC and the EIR, although technically separate functions from the HLR 120, are shown together since combining them can be performed in the network. The HLR 120 can interface to a PPCA database 121 that facilitates storage and correlation of authorized subscribers and PPCA BTSs in accordance with the disclosed architecture.

The combination of a cell phone 114 and a SIM card (not shown) creates a special digital signature that includes a subscriber number which is sent from the cell phone 114 to the nearest BTS 108 asking that the subscriber of a particular network be allowed to use the network. The request is passed on along to the heart of a cellular network, the MSC 116. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

Figure 3:
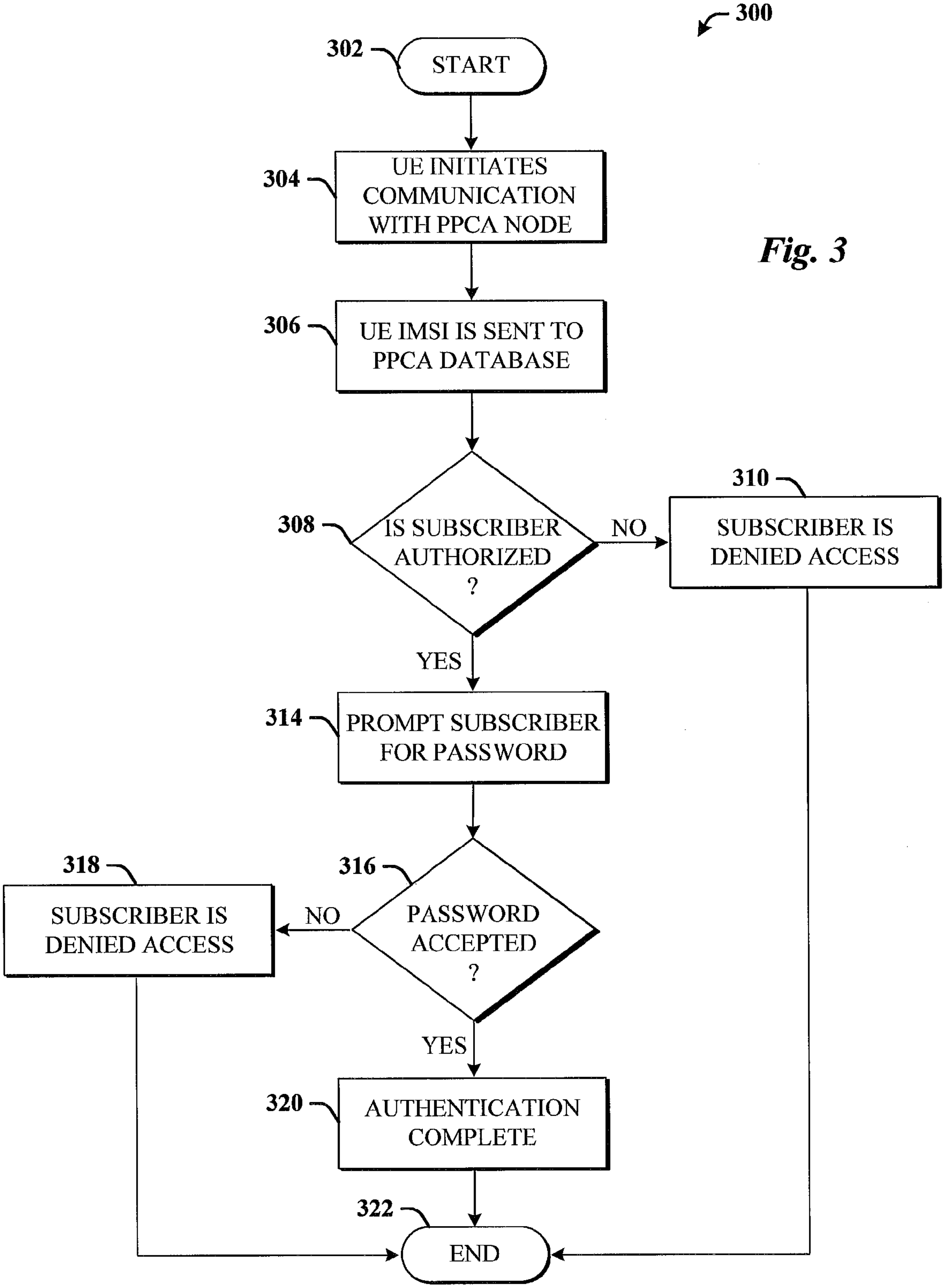
FIG. 3 illustrates an exemplary method for procuring wireless access in accordance with an embodiment of the present invention.

If the subscriber wants to make an outgoing call with a PPCA BTS 109, the call is routed to the MSC which may then begin an authentication procedure such as the exemplary authentication procedure described in FIG. 3.

The NSS 104 also contains the component called HLR 120 that provides the administrative information required to authenticate, register and locate the caller as that network's subscriber. Once the HLR 120 has received a log-on request, the HLR 120 immediately checks the special signature contained in the request against the HLR subscriber database. If the subscription is current, the MSC 106 sends a message back to the phone via the network of BTS 108 that indicates the caller is allowed to access the network. For calls originating from a phone served by a PPCA cell, the identifier is sent to the HLR 120 and/or the PPCA database 121 and it is determined if the subscriber is authorized to utilize the PPCA cell.

The HLR 120 registers which MSC the cell phone is currently connected to, so that when the network MSC 116 needs to route an incoming call to the cell phone number, it will first check the HLR 120 to see which MSC is currently serving the cell phone. Periodically, the cell phone will send a message to the MSC indicating where it is, in a process called polling. The combination of the tracking function and the caller's unique digital signature allows the MSC 116 to route that call to the precise base station the cell phone happens to be connected to, and then exclusively to the cell phone, even if a number of other subscribers are simultaneously connected to that base station. Routing of an incoming call to a cell phone served by a PPCA cell may be accomplished in a similar manner.

When traveling to another MSC coverage area while driving, for example, the HLR 120 is automatically updated, and continues to monitor where exactly it should route the calls should the caller then move within range of another base station. This routing procedure means that out of hundreds of thousands of subscribers, only the correct cell phone will ring when necessary.

The NSS 104 has a direct connection to the PSTN (public switched telephone network) 122 from the MSC 116. There is also a connection from the NSS 104 to the GPRS core network 106 via a Gr/Gs interface although this is optional and not always implemented. The illustrated GPRS Core Network 106 is simplified to include a SGSN 124 (connected to the BSS 102 by the Gb interface) and a GGSN 126. The SGSN 124 and the GGSN 126 are connected together by a private IP network 128 called a GPRS backbone shown as the Gn reference point. A computer 130 is depicted as connecting to the core network 106 via an Internet or corporate network 132. Subscribers served by PPCA cell sites may have access to voice and/or data services.

Although applicable to any existing or yet to be developed wireless telecommunications network, aspects of the disclosed architecture have been described with reference to the GSM air interface that uses general packet radio service (GPRS) as an enabling bearer. As indicated above, examples of other suitable wireless and radio frequency data transmission systems include networks utilizing TDMA, frequency division multiple access (FDMA), wideband code division multiple access (WCDMA), orthogonal frequency division multiplexing (OFDM), and various other 2.5 and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols.

Figure 2:
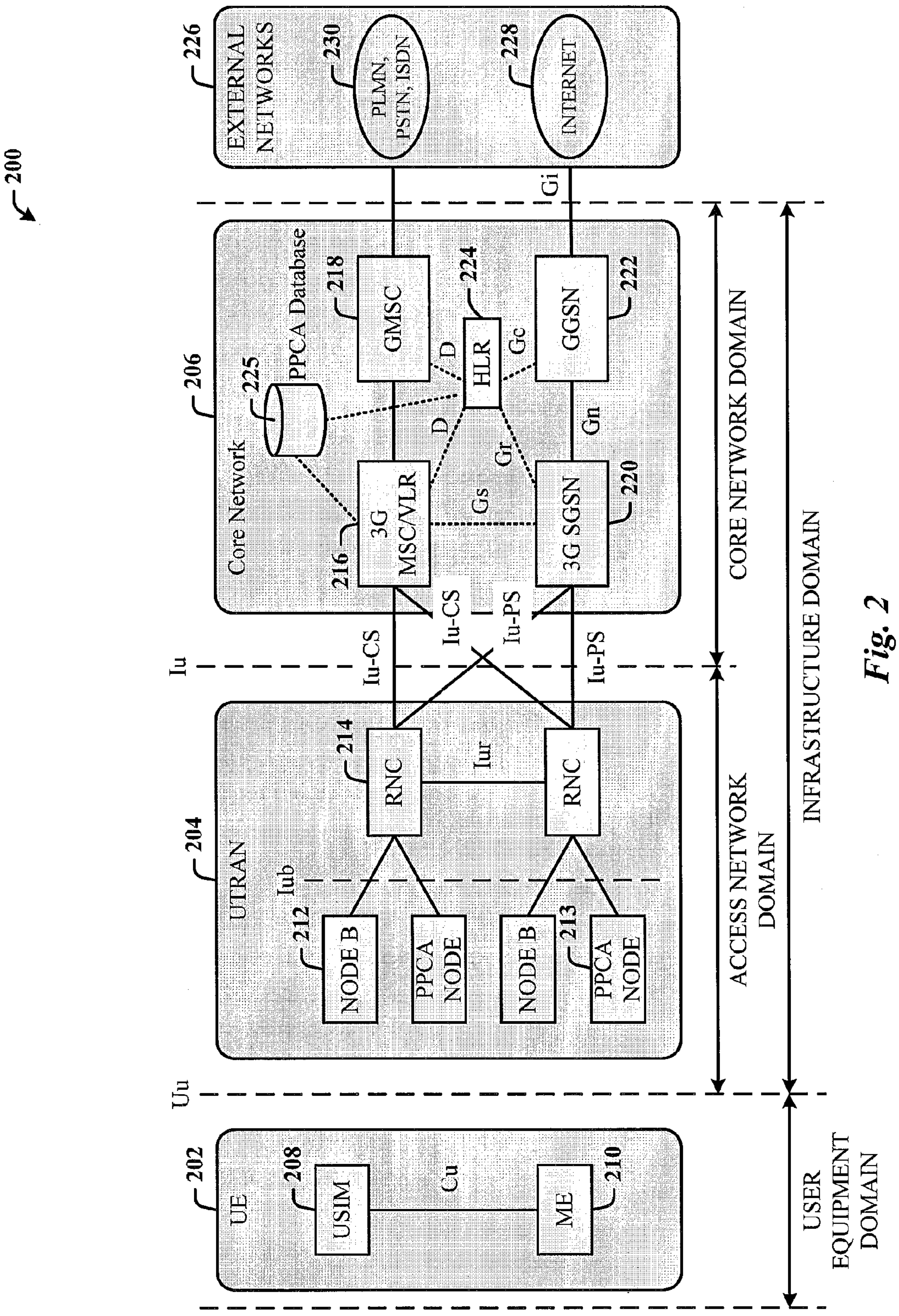
FIG. 2 illustrates an exemplary Universal Mobile Telecommunications System (UMTS) in accordance with an embodiment of the present invention.

FIG. 2 illustrates an exemplary UMTS network 200 in accordance with an embodiment of the present invention. The architecture is based on the 3 GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 200 can consist of three interacting domains; a user equipment (UE) domain 202, a UMTS Terrestrial Radio Access Network (UTRAN) domain 204, and a core network (CN) domain 206. The UTRAN domain 204 is also referred to as the access network domain and the CN 206 is referred to as the core network domain, the both of which comprise an infrastructure domain.

The UE domain 202 includes a USIM (user services identity module) domain and an ME (mobile equipment) domain. User equipment is the equipment used by the user to access UMTS services. In the UE domain 202, the UMTS IC card is the USIM 208 which has the same physical characteristics as GSM SIM (subscriber identity module) card. The USIM interfaces to ME 210 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV). These identifiers may be used to identify a particular subscriber/UE for access to a PPCA node 213.

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 204 provides the air interface access method for the UE domain 202. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 212, and control equipment for Node-B devices is called a radio network controller (RNC) 214. The interface between the Node-B device and the RNC 214 is the Iub interface. The interface between two RNCs is called the Iur interface.

In addition and in accordance with an exemplary embodiment of the present invention, the illustrated UTRAN 204 includes a Password-Protected Cellular Access (PPCA) node 213. In an exemplary embodiment, the PPCA node 213 is in communication with the RNC via the Iub interface. The PPCA node 213 may alternatively be in communication with an RNC deployed exclusively for use with one or more PPCA nodes.

The PPCA node 213 is configured to allow only a selected group of subscribers to access the network. In one exemplary embodiment, the PPCA node 213 is configured for use in a secure network such as a military or law enforcement application. The PPCA node 213 employs at least a two level security system. An exemplary first security level utilizes a subscriber identifier such as an International Mobile Subscriber Identity (IMSI) to authenticate the use of the PPCA node 213. In this example, a subscriber's IMSI is stored in a database and correlated with one or more PPCA nodes. In the illustrated UMTS network 200, a dedicated PPCA database

225 is provided; however, the present invention may utilize the resources of a home location register (HLR), a visiting location register (VLR), and/or one or more additional databases that perform functions other than those described with regard to the present invention to store the correlated data. As an exemplary secondary security level, a subscriber may be prompted to enter a password to further verify the subscriber's identity. Security questions may also be implemented.

The functions of Node-S devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control. The PPCA node 213 functions similarly while providing restricted access only to those subscribers that are authorized and authenticated.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a MSC/VLR 216, and GMSC 218. Packet-switched elements include a serving GPRS support node (SGSN) 220 and gateway GPRS support node (GGSN) 222. Some network elements such as an EIR (equipment identity register) (not shown), HLR (home location register) 224, VLR and AuC (authentication center) (not shown) can be shared by both domains.

A function of the CN 206 is to provide switching, routing and transit for user traffic. The CN 206 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 206 interfaces to the radio access domain via an Iu interface. An Iu-CS (circuit-switched) reference point interfaces an RNC of the access network to the MSC/VLR entity 216 of the CN 206 for voice from/to the MSC/VLR 216. An Iu-PS (packet-switched) reference point interfaces an RNC of the access network to the SGSN entity 220 of the CN 206 for data from/to the SGSN 220.

In the CN 206, a Gs interface is provided between the MSC/VLR 216 and the SGSN. A Gn interface is provided between the SGSN 220 and the GGSN 222. A D interface is provided between the MSC/VLR 216 and the HLR 224, and the HLR 224 and the GMSC 218. A Gr interface is provided between the SGSN 220 and the HLR 224. A Gc interface is provided between the GGSN 222 and the HLR 224.

The CN 206 provides the interface from the UE domain 202 to external networks 226 such as the Internet 228 via a Gi interface from the GGSN 222, and other networks 230 via the GMSC 218, which can include a PLMN (public land mobile network), PSTN and ISDN (integrated service digital network) networks.

Referring now to FIG. 3, an exemplary method illustrated in accordance with an embodiment of the present invention. It should be understood that the illustrated method is not limited to the steps shown nor the order of the steps shown and is provided solely as a basis for teaching exemplary embodiments of the present invention. Accordingly, amendments to this method and/or the addition, elimination, or combination of one or more steps may be made to achieve like results and still be within the scope of the present invention. Further, the method is described with reference to the UMTS embodiment illustrated in FIG. 2; however, the method is extensible to other network types.

The method 300 begins at step 302 and proceeds to step 304 wherein the UE initiates communication with a PPCA node 213. The UE then sends an identifier (e.g., an IMSI) to the PPCA database 225 at step 306. The PPCA database 225 receives the IMSI and determines, in step 308, if the subscriber is authorized to use the PPCA node 213. If the subscriber's IMSI does not properly correlate to the requested PPCA node 213, then the method 300 proceeds to step 310 wherein the subscriber is denied access. The method 300 then proceeds to step 322 and the method 300 ends. If the subscriber is authorized, however, the method 300 then proceeds to step 314 and the user is prompted for a password. The password may be a numeric, alphabetic, or alphanumeric password that may be entered on a keypad of the UE or spoken to a voice recognition system and submitted to the MSC 216. Speaker recognition and speech recognition based passwords may also be implemented. In other embodiments, the password may be a visual password such as an image, photograph, or video. For example, an image may be selected by the subscriber as his/her password or a portion thereof. In this example, the password prompt may include a plurality of images one of which is the subscriber's selected image. The subscriber could select the correct image for authentication. As an alternative, a photograph may be used wherein the subscriber may send a photograph of an identification such as a license or law enforcement badge for verification by the appropriate database 120, 121. Fingerprint identification, retinal scans, and the like are also contemplated.

At step 316 it is determined if the password is correct. If the password is incorrect, the method 300 proceeds to step 318 and the subscriber is denied access. If the password is correct, however, the method 300 proceeds to step 320 wherein the UE is authenticated for communication with the PPCA node 213.

As an optional authentication step, the subscriber may be required to answer security questions and/or provide further identification data to verify the identity of the subscriber.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for providing wireless telecommunications access to authorized wireless service subscribers, comprising:

receiving, at a password-protected cellular access node, an identifier from a mobile terminal, before receiving a password from the mobile terminal, the identifier identifying the mobile terminal;

correlating, at the password-protected cellular access node in a correlation act, the identifier with password-protected cellular access node data stored in a password-protected cellular access database associated with the password-protected cellular access node, the password-protected cellular access node data comprising identifiers and passwords for a plurality of mobile terminals that are authorized to access the password-protected cellular access node;

determining, at the password-protected cellular access node based upon the correlation between the identifier and the password-protected cellular access node data, whether the mobile terminal is authorized to use the password-protected cellular access node for wireless telecommunications access;

denying, at the password-protected cellular access node, the mobile terminal wireless telecommunications access via the password-protected cellular access node if it is determined, based upon the correlation, that the mobile terminal is not authorized to use the password-protected cellular access node for wireless telecommunications access;

sending, from the password-protected cellular access node, a password request to the mobile terminal only if it is determined, based upon the correlation, that the mobile terminal is authorized to use the password-protected cellular access node for wireless telecommunications access;

receiving, at the password-protected cellular access node, a password request response from the mobile terminal, the password request response comprising a password;

correlating, at the password-protected cellular access node, the password received in the password request response with the passwords in the password-protected cellular access node data stored within the password-protected cellular access database;

denying, at the password-protected cellular access node, the mobile terminal wireless telecommunications access via the password-protected cellular access node if the password received in the password request response is not equivalent to one of the passwords stored in the password-protected cellular access database; and allowing, at the password-protected cellular access node, the mobile terminal wireless telecommunications access via the password-protected cellular access node if the password is equivalent to one of the passwords stored in the password-protected cellular access database.

2. The method of claim 1, wherein receiving, at the password-protected cellular access node, the identifier from the mobile terminal comprises the password-protected cellular access node receiving the identifier being an identifier selected from a group of identifiers consisting of: an international mobile subscriber identity, a temporary mobile subscriber identity; a packet temporary mobile subscriber identity, a temporary logical link identity, a mobile station ISDN, a international mobile station equipment identity, and an international mobile station equipment identity and software version number.

3. The method of claim 1, further comprising:

the password-protected cellular access node sending a security question request to the mobile terminal, the security question request comprising a security question that is stored as part of the password-protected cellular access node data stored in the password-protected cellular access node database, and the security question being associated with a correct answer also stored in the password-protected cellular access node database;

receiving, at the password-protected cellular access node, a security question response from the mobile terminal, the security question response comprising an answer to the security question;

correlating, at the password-protected cellular access node, the answer to the security question received in the security question response to the correct answer to the security question stored within the password-protected cellular access database; and denying, at the password-protected cellular access node, the mobile terminal wireless telecommunications access via the password-protected cellular access node if the answer to the security question received in the security question response is not equivalent to the correct answer stored in the password-protected cellular access database;

wherein allowing, at the password-protected cellular access node, the mobile terminal wireless telecommunications access via the password-protected cellular access node is performed if:

the security question response is equivalent to the correct answer stored in the password-protected cellular access database; and the password is equivalent to one of the passwords stored in the password-protected cellular access database.

4. The method of claim 1, wherein, in receiving, at the password-protected cellular access node, the password request response from the mobile terminal, the password request response includes a type of password selected from a group of password types consisting of: a numeric password, an alphabetic password, an alphanumeric password, a speaker recognition password, a speech recognition password, an image password, a photograph password, a video password, a fingerprint identification password, and a retinal scan password.

5. A non-transitory computer-readable medium of a password-protected cellular access node, the computer-readable medium comprising computer-executable instructions that, when executed by a processor of the password-protected cellular access node, cause the password-protected access node to perform acts of:

receiving an identifier from a mobile terminal, before receiving a password from the mobile terminal, the identifier identifying the mobile terminal;

correlating, in a correlation act, the identifier with password-protected cellular access node data stored in a password-protected cellular access database associated with the password-protected cellular access node, the password-protected cellular access node data comprising identifiers and passwords for a plurality of mobile terminals that are authorized to access the password-protected cellular access node;

determining, based upon the correlation between the identifier and the password-protected cellular access node data, whether the mobile terminal is authorized to use the password-protected cellular access node for wireless telecommunications access;

denying the mobile terminal wireless telecommunications access via the password-protected cellular access node if it is determined, based upon the correlation, that the mobile terminal is not authorized to use the password-protected cellular access node for wireless telecommunications access;

sending, from the password-protected cellular access node, a password request to the mobile terminal only if it is determined, based upon the correlation that the mobile terminal is authorized to use the password-protected cellular access node for wireless telecommunications access;

receiving, at the password-protected cellular access node, a password request response from the mobile terminal, the password request response comprising a password;

correlating, at the password-protected cellular access node, the password received in the password request response to the passwords in the password-protected cellular access node data stored within the password-protected cellular access database;

denying, at the password-protected cellular access node, the mobile terminal wireless telecommunications access via the password-protected cellular access node if the password received in the password request response is not equivalent to one of the passwords stored in the password-protected cellular access database; and allowing, at the password-protected cellular access node, the mobile terminal wireless telecommunications access via the password-protected cellular access node if the password is equivalent to one of the passwords stored in the password-protected cellular access database.

6. The non-transitory computer-readable medium of claim 5, wherein the instructions for receiving the identifier from the mobile terminal further comprise instructions for receiving the identifier selected from a group, consisting of: an international mobile subscriber identity, a temporary mobile subscriber identity; a packet temporary mobile subscriber identity, a temporary logical link identity, a mobile station ISDN, an international mobile station equipment identity, and an international mode station equipment identity and software version number.

7. The non-transitory computer-readable medium of claim 5, wherein, in the instructions for receiving the password request response from the mobile terminal, the password request response includes a type of password selected from a group of password types consisting of: a numeric password, an alphabetic password, an alphanumeric password, a speaker recognition password, a speech recognition password, a fingerprint identification password, and a retinal scan password.

8. The tangible computer-readable medium of claim 5, further comprising instructions which, when executed, perform the additional steps of:

sending a security question request to the mobile terminal, the security question request comprising a security question that is stored as part of the password-protected cellular access node data stored in the password-protected cellular access node database and the security question being associated with a correct answer also stored in the password-protected cellular access node database;

receiving a security question response from the mobile terminal, the security question response comprising an answer to the security questions;

correlating the answer to the security question received in the security question response to the correct answer to the security question stored within the password-protected cellular access database;

denying the mobile terminal wireless telecommunications access via the password-protected cellular access node, if the answer to the security question received in the security question response is not equivalent to the correct answer stored in the password-protected cellular access database; and allowing the mobile terminal wireless telecommunications access via the password-protected cellular access node if:

the security question response is equivalent to the correct answer stored in the password-protected cellular access database; and the password is equivalent to one of the passwords stored in the password-protected cellular access database.

9. A system for providing wireless telecommunication access to authorized wireless service subscribers, the system comprising:

a password-protected cellular access node; and a password-protected cellular access database configured to store password-protected cellular access node data;

the password-protected cellular access node being configured to:

receive an identifier from a mobile terminal, before receiving a password from the mobile terminal, the identifier identifying the mobile terminal;

correlate, in a correlation act, the identifier with the password-protected cellular access node data stored in the password-protected cellular access database, the password-protected cellular access node data comprising identifiers and passwords for a plurality of mobile terminals that are authorized to access the password-protected cellular access node;

determine, based upon the correlation between the identifier and the password-protected cellular access node data, whether the mobile terminal is authorized to use the password-protected cellular access node for wireless telecommunications access;

deny the mobile terminal wireless telecommunications access via the password-protected cellular access node if it is determined, based upon the correlation, that the mobile terminal is not authorized to use the password-protected cellular access node for wireless telecommunications access;

send a password request to the mobile terminal, only if it is determined, based upon the correlation, that the mobile terminal is authorized to use the password-protected cellular access node for wireless telecommunications access;

receive a password request response from the mobile terminal, the password request response comprising a password;

correlate the password received in the password request response to the passwords in the password-protected cellular access node data stored within the password-protected cellular access database;

deny the mobile terminal telecommunications access via the password-protected cellular access node if the password received in the password request response is not equivalent to one of the passwords stored in the password-protected cellular access database; and allow the mobile terminal wireless telecommunications access via the password-protected cellular access node if the password is equivalent to one of the passwords stored in the password-protected cellular access database.

10. The system of claim 9, wherein the password-protected cellular access database is configured within the password-protected cellular access node.

11. The system of claim 9, wherein the identifier is selected from the group, consisting of: an international mobile subscriber identity, a temporary mobile subscriber identity, a packet temporary mobile subscriber identity, a temporary logical link identity, a mobile station ISDN, an international mobile station equipment identity, and international mobile station equipment identity, and international mobile station equipment identity and software version number.

12. The system of claim 11, wherein the password is selected from a group of password types consisting of: a numeric password, an alphabetic password, an alphanumeric password a speaker recognition password, a speech recognition password, an image password, a photograph password, a video password, a fingerprint identification password, and a retinal scan password.

13. The system of claim 9, wherein:

the password-protected cellular access database is further configured to store a security question and a correct answer to the security question as part of the password-protected cellular access node data; and the password-protected cellular access node is further configured to:

send a security question request to the mobile terminal, the security questions request comprising the security question;

receive a security question response from the mobile terminal, the security question response comprising an answer to the security questions;

correlate the answer to the security question received in the security question response to the correct answer to the security question stored within the password-protected cellular access database;

deny the mobile terminal telecommunications access via the password-protected cellular access node, if the answer to the security question received in the security question response is not equivalent to the correct answer stored in the password-protected cellular access database; and allow the mobile terminal wireless telecommunications access via the password-protected cellular access node, if:

the security question response is equivalent to the correct answer stored in the password-protected cellular access database; and the password is equivalent to one of the passwords stored in the password-protected cellular access database.

* * * * *